(12) United States Patent
Stacey et al.

(10) Patent No.: US 7,546,431 B2
(45) Date of Patent: Jun. 9, 2009

(54) DISTRIBUTED OPEN WRITABLE SNAPSHOT COPY FACILITY USING FILE MIGRATION POLICIES

(75) Inventors: Christopher H. Stacey, Swindon (GB); Eyal Zimran, Richmond (GB)

(73) Assignee: EMC Corporation, Hopkinton, MA (US)

( * ) Notice: Subject to any disclaimer, the term of this patent is extended or adjusted under 35 U.S.C. 154(b) by 995 days.

(21) Appl. No.: 11/085,911

(22) Filed: Mar. 21, 2005

(65) Prior Publication Data

US 2006/0212481 A1 Sep. 21, 2006

(51) Int. Cl.
G06F 12/16 (2006.01)
G06F 17/30 (2006.01)

(52) U.S. Cl. .................. 711/165; 711/161; 711/162; 707/104.1; 707/204

(58) Field of Classification Search ............. 711/161, 711/162, 165; 707/104.1, 204
See application file for complete search history.

(56) References Cited

U.S. PATENT DOCUMENTS

| 5,835,954 | A | 11/1998 | Duyanovich et al. | 711/162 |
|---|---|---|---|---|
| 5,893,140 | A | 4/1999 | Vahalia et al. | 711/118 |
| 5,923,878 | A | 7/1999 | Marsland | 395/704 |
| 5,963,962 | A | 10/1999 | Hitz et al. | 707/202 |
| 5,974,563 | A | 10/1999 | Beeler, Jr. | 714/5 |
| 6,076,148 | A | 6/2000 | Kedem | 711/162 |
| 6,078,929 | A | 6/2000 | Rao | 707/200 |
| 6,490,666 | B1 | 12/2002 | Cabrera et al. | 711/161 |
| 6,665,689 | B2 | 12/2003 | Muhlestein | 707/204 |
| 6,757,794 | B2 | 6/2004 | Cabrera et al. | 711/156 |
| 6,792,518 | B2 | 9/2004 | Armangau et al. | 711/162 |
| 6,804,719 | B1 | 10/2004 | Cabrera et al. | 709/226 |
| 7,326,709 | B2 * | 2/2008 | Yuan et al. | 514/250 |
| 2004/0107222 | A1 | 6/2004 | Venkatesh et al. | 707/200 |
| 2005/0246716 | A1 * | 11/2005 | Smith et al. | 719/315 |

OTHER PUBLICATIONS

"Celerra Data Migration Service (CDMS)," EMC Corporation, Hopkinton, MA, Jan. 2002, 14 pages.

"EMC Centera Solutions, EMC Avalon-Centera Single Point of Access Solution," EMC Corporation, Hopkinton, MA, Oct. 2002, 4 pages.

Technology Brief—Aug. 2002, "Automated Resource Management," The Enterprise Storage Group, Milford, MA, Aug. 2002, 3 pages.

(Continued)

*Primary Examiner*—Jack A Lane
(74) *Attorney, Agent, or Firm*—Richard C. Auchterlonic; Novak Druce & Quigg, LLP.

(57) ABSTRACT

A read-write snapshot copy facility is constructed from a hierarchical storage management facility. The read-write snapshot copy file system initially comprises stub files pointing to the files in a read-only snapshot copy file system. When an application writes to a file in the read-write snapshot copy, the read-write snapshot copy facility migrates a copy of the file to replace the stub file, and then writes to the migrated file. Because the read-write snapshot copy facility references the files in the read-only snapshot file system in a network namespace using standard protocols such as NFS or CIFS, the read-write snapshot copy facility permits referencing of distributed read-only snapshot file systems in an open (heterogeneous) network environment, and the read-write snapshot copy is scalable by linking the read-write snapshot copy facility to multiple file servers containing read-only snapshot file systems.

20 Claims, 9 Drawing Sheets

OTHER PUBLICATIONS

"Oracle9i with Celerra File Serve over NFS," EMC Corporation, Hopkinton, MA, Nov. 22, 2002, 15 pages.

Nancy Marrone, Product Brief—Apr. 2003, "Astrum's Active Storage Management Solution Key to EMC's Mid-Tier Software Offering," The Enterprise Storage Group, Milford, MA, Apr. 2003, 2 pages.

Data Sheet, "EMC AVALONidm, Intelligent data management to lower total cost of storage," EMC Corporation, Hopkinton, MA, Jul. 2003, 4 pages.

Jamie Gruener et al., "Digital Content and Storage Management in the Media and Entertainment Industry," The Yankee Group, Boston, MA, Nov. 2003, 16 pages.

*On Life in Information*, vol. 1, 2004, Doing More with Storage, EMC Corporation, Hopkinton, MA, Mar. 2004, 32 pages.

"Information Lifecycle Management Updates," EMC Corporation, Hopkinton, MA, Oct. 2004, 2 pages.

EMC Centera Partner Solutions, "EMC-LEGATO E-mail Archiving Solution," EMC Corporation, Hopkinton, MA, Jul. 2004, 4 pages.

"EMC: Information Lifecycle Management: Real Results for Business Realities," EMC Corporation, Hopkinton, MA, http://www.emc.com/ilm/ilm_update, printed Jan. 26, 2005, 4 pages.

"OLE Component Object Model," Object Services and Consulting, Inc., Dallas, Texas, http://www.objs.com/x3h7/ole2.htm, printed Mar. 14, 2005, 7 pages.

\* cited by examiner

DISTRIBUTED OPEN WRITABLE SNAPSHOT COPY FACILITY USING FILE MIGRATION POLICIES

FIELD OF THE INVENTION

The present invention relates generally to data networks, and more particularly to migration of file data over a data network or within a file server facility. The invention specifically relates to a distributed open writable snapshot copy facility that uses file migration policies.

BACKGROUND OF THE INVENTION

Data network technology permits multiple users to share economically access to files in a number of file servers. Problems arise, however, in the assignment of files to particular servers. For example, it may be desirable to move a file from one file server to another when a new server is added to the network. A "CDMS" brand of data migration service provided by EMC Corporation of Hopkinton, Mass., can be used to move files from one file server to another while permitting concurrent client access to the files.

In a typical use of the EMC Corporation "CDMS" brand of data migration service, respective IP addresses are assigned to file systems. In order to migrate a file system from a source file server to a target file server, the IP address of the file system is reassigned from the source file server to the target file server, the file system is then mounted as a read-only file system in the source file server, and then the migration service is invoked in the target file server. The migration service in the target file server then begins a background process of using a protocol such as NFS, CIFS or HTTP to copy the files and directories from the read-only file system in the source file server to a temporary migration inode data structure in the target file server. The migration service in the target file server concurrently responds to client requests for access to a directory or file in the file system on a priority basis by checking the migration inode data structure to determine whether the directory, file, or portion of the file to be accessed has already been copied from the source file server to the target file server, and if so, then accessing the directory or file in the target file server, and if not, by fetching the directory or file from the source file server, storing the directory or file in the migration inode data structure in the target file server, and accessing the directory or file in the target file server. Once the entire file system has been copied from the source file server to the target file server, the migration inode data structure is converted to a conventional inode data structure for the file system in the target file server, and then the read-only version of the file system is deleted from the source file server.

The EMC Corporation "CDMS" brand of data migration service can be used to migrate a file system within the same file server. In other words, a read-only file system can be copied within the same file server while permitting concurrent read-write access to the copy of the file system. In addition, the EMC Corporation "CDMS" brand of data migration service can migrate specified files of a file system, or a specified extent of data within a file.

Files are also often moved between file servers in order to relocate infrequently accessed files from expensive, high-speed disk storage to more economical but slower mass storage. When a client needs read-write access to a file in the mass storage, it typically is moved back to the high-speed disk storage, and then accessed in the high-speed disk storage. This kind of migration of files between levels of storage in response to client requests based on file attributes such as the time of last file access and last file modification is known generally as policy-based file migration or more specifically as hierarchical storage management (HSM). It is desired for such policy-based or hierarchical storage management to be transparent to the clients, yet in practice there is always a trade-off between cost of storage and delay in file access.

In a system employing hierarchical storage management, when a file or data blocks of a file are moved from a primary file server to a secondary file server, the file in the primary file server is typically replaced with a stub file that contains attributes of the file and a link to the new file location in the secondary file server. The stub file can be accessed to redirect an access request from a client to the new file location in the secondary server, or to migrate data from the present file location back to the primary file server. This stub file can be a symbolic link file in a UNIX-based file system, or a shortcut file in a Microsoft WINDOWS file system. In a computer using the Microsoft WINDOWS operating system, access to a stub file may automatically result in access to the new file location. For example, an attempt to execute or open a shortcut will cause the Microsoft WINDOWS operating system to execute or open the target of the shortcut.

A snapshot copy of a production file system contains the state of the production file system at a respective point in time when the snapshot copy is created. A snapshot copy facility can create a snapshot copy without any substantial disruption to concurrent read-write access to the production file system. Such a snapshot copy facility, for example, is described in Keedem U.S. Pat. No. 6,076,148 issued Jun. 13, 2000, incorporated herein by reference, and in Armangau et al., U.S. Pat. No. 6,792,518, incorporated herein by reference. Snapshot copies have been used for a variety of data processing and storage management functions such as storage backup, transaction processing, and software debugging.

Users are becoming less tolerant of delays in accessing their data, and even less tolerant of corruption of their data. Therefore, there has been a continuing interest in improving data availability and the effectiveness of recovery procedures. For example, after recovery, the integrity of the recovered file system is checked, and if a defect is found, an attempt is made to correct it. In addition, it is often possible to recover some of the data that was written to the production file system since the creation of the latest read-only version, for example, by replay of a log from an application program.

SUMMARY OF THE INVENTION

In accordance with one aspect, the invention provides a method including a read-write snapshot copy facility creating a read-write snapshot copy of at least a portion of a production file system by creating stub files including pointers to data files in a read-only snapshot copy of at least the portion of the production file system. The method also includes the read-write snapshot copy facility responding to a read request from an application program to read data from a read-write snapshot copy of at least a portion of one of the data files in the read-only snapshot copy of at least the portion of the production file system by accessing one of the stub files to obtain a pointer to the one of the data files, and using the pointer to the one of the data files to read data from the one of the data files and to return the data read from the one of the data files to the application program. The method further includes the read-write snapshot copy facility responding to a write request from the application program to write data to a read-write snapshot copy of at least a portion of another of the data files in the read-only snapshot copy of at least the portion of the production file system by accessing another of the stub files to obtain a pointer to the another of the data files, and using the pointer to the another of the data files to read data from the another of the data files to produce a file that is written to by the application program and that replaces the another of the stub files.

In accordance with another aspect, the invention provides an apparatus including a data processing device having storage and a read-write snapshot copy facility. The read-write snapshot copy facility is programmed for creating, in the storage of the data processing device, stub files including pointers to data files in a read-only snapshot copy of at least a portion of a production file system. The read-write snapshot copy facility is also programmed for responding to a read request from an application program to read data from a read-write snapshot copy of at least a portion of one of the data files in the read-only snapshot copy of at least the portion of the production file system by accessing one of the stub files to obtain a pointer to the one of the data files, and using the pointer to the one of the data files to read data from the one of the data files and to return the data read from the one of the data files to the application program. The read-write snapshot copy facility is further programmed for responding to a write request from the application program to write data to a read-write snapshot copy of at least a portion of another of the data files in the read-only snapshot copy of at least the portion of the production file system by accessing another of the stub files to obtain a pointer to the another of the data files, and using the pointer to the another of the data files to read data from the another of the data files to produce a file that is written to by the application program and that replaces the another of the stub files.

A read-write snapshot copy created and maintained as described above may be promoted to an independent production file system. This is done by migration of the read-only snapshot data that is referenced by the stub files in order to create ordinary read-write data files that can be used for replacing the stub files. Once the stub files are replaced with the ordinary data files, the read-only snapshot copy can be deleted.

BRIEF DESCRIPTION OF THE DRAWINGS

Additional features and advantages of the invention will be described below with reference to the drawings, in which.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

Figure 1:
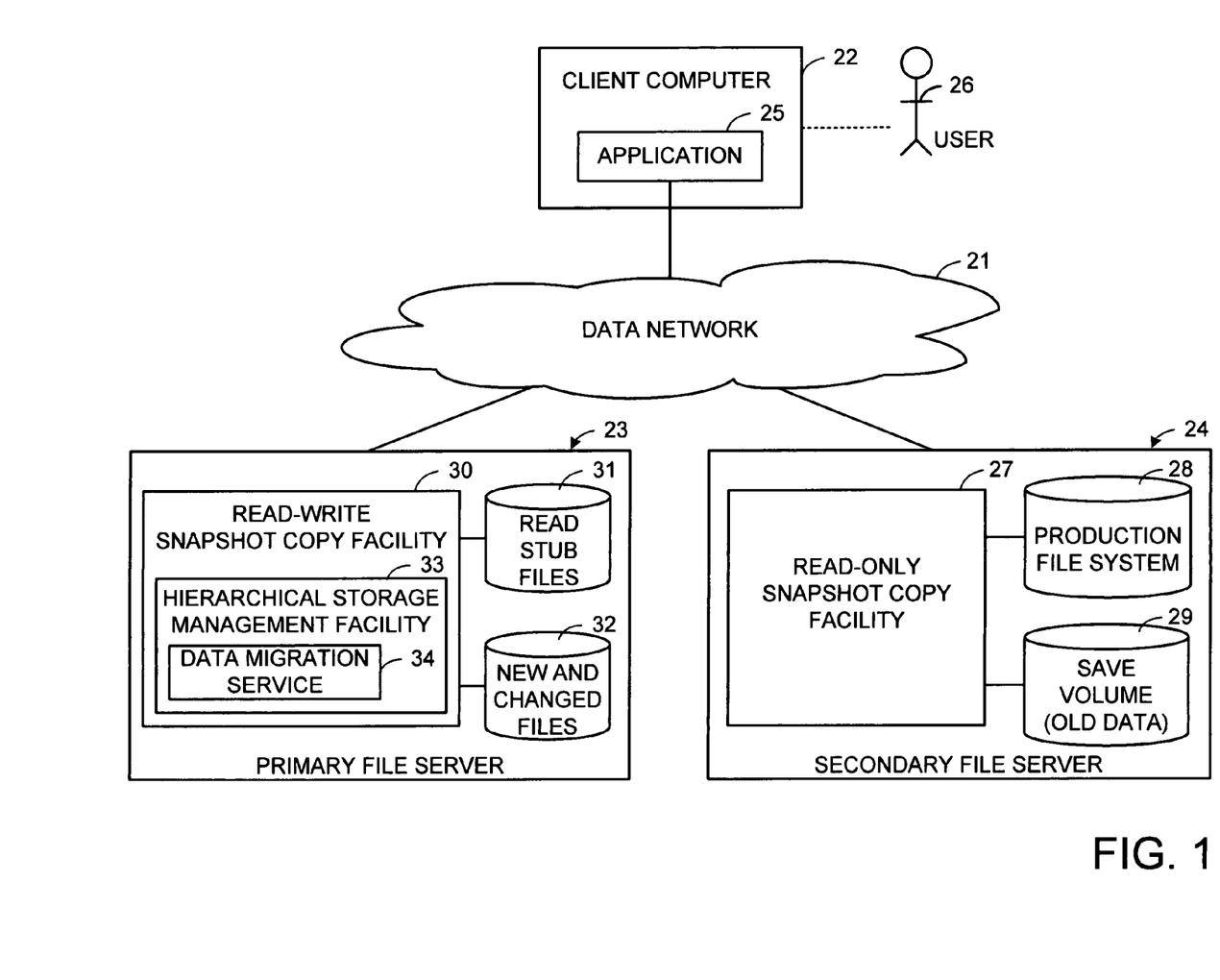
FIG. 1 is a block diagram of a data processing system including a distributed open writable snapshot copy facility in accordance with the present invention.

With reference to FIG. 1, there is shown a data processing system including a data network 21 interconnecting a client 22 to a primary file server 23 and a secondary file server 24. The data network 21 may include any one or more of network connection technologies, such as Ethernet or Fibre Channel, and communication protocols, such as TCP/IP or UDP. The clients 22, for example, is a work station such as a personal computer executing an application program 25 for a human user 26.

The primary file server 23, for example, is a cached disk array as described in Vahalia et al., U.S. Pat. No. 5,893,140 issued Apr. 6, 1999, incorporated herein by reference. Such a cached disk array 23 is manufactured and sold by EMC Corporation, 176 South Street, Hopkinton, Mass. 01748. The secondary network file 24, for example, is a conventional file server.

In the data processing system of FIG. 1, the secondary file server 24 is programmed with a read-only snapshot copy facility 27 for taking a series of snapshot copies of a production file system 28. For example, whenever data in the production file system is to be modified, the old version of the data is copied to a save volume 29, before the new data is written to the production file system 28. Such a read-only snapshot copy facility is described in Armangau et al., U.S. Pat. No. 6,792,518, incorporated herein by reference.

In practice, the secondary file server 24 is used for providing data recovery in the event of corruption of data in the primary file server 23. The read-only snapshot copy facility 27 takes a snapshot of a consistent state of the production file system after a transaction is performed upon the file system. To recover from a typical failure of the primary file server 23, the primary file server 23 is re-booted, and re-configured to swap-out any failed storage devices. Then the last snapshot copy of the production file system is read from the secondary file server 24 and written to the primary file server. Then a transaction log is accessed to re-do the transactions that had been performed since the last snapshot was taken, up to the time of the failure.

Unfortunately, it is possible that data processing in the system of FIG. 1 may continue for some time after corruption begins in a production file system. This is often due to the presence of a software bug, a virus, or malicious tampering of a program or data. Recovery in these situations is sometimes possible by applying a transaction log to snapshot copy of the production file system that is older than the last snapshot copy. In some situations, however, the application of the transaction log will not recover the production file system to a consistent and correct state. In these situations, if is often necessary for the file system to be inspected and corrected by a system administrator or file system checking program.

In situations where it is doubtful that a corrupted production file system can be corrected by a particular method, a copy will be made of a snapshot of the production file system, and an attempt will be made to reconstruct a consistent and correct version of the production file system by modifying the copy. If the attempt fails, then the modified copy is discarded. Otherwise, if the attempt is considered successful, the production file system is replaced with the copy.

For a very large file system, considerable processing time is required for copying an entire production file system. Yet in many cases, only a small portion of a snapshot of a production file system will need to be modified in order to run an application, or to recover from a corruption of the production file system. Therefore it is desirable to provide a read-write snapshot copy facility that presents to an application program a view of a read-write snapshot copy without copying all of the files to be included in the read-write snapshot copy. This can be done by creating a read-only snapshot copy of the production file system, and keeping track of changes that are made to the read-write snapshot copy since the time of creating the read-only snapshot copy of the production file system.

There are many other situations that may require a read-write snapshot copy. Read-write snapshot copies can be used as additional working sets to speed-up and parallelize processing, without the need to multiply the entire production environment. This will result in a considerable saving of file server resources and storage space. The additional read-write copies allow concurrent data processing without the need to fully duplicate the production file system. This facilitates operation in a non-deterministic environment where the files required to be changed by the application are not pre-known. Also, any of the additional read-write snapshot copies could be promoted to become a new production file system. This new production file system could be the source for further read-only snapshot copies as well as read-write snapshot copies.

As shown in FIG. 1, the primary file server has a read-write snapshot copy facility 30 that keeps track of data files in the read-write snapshot copy file system that are different from data files in the read-only snapshot copy of the production file system. For each data file in the read-write snapshot copy file system that is the same as a file in the read-only snapshot copy of the production file system, the primary file server stores a respective read stub file in a set of read stub files 31 maintained by the read-write snapshot copy facility 30. The read stub file has an offline attribute indicating that data for the stub file is offline (i.e., resides in another file server), and a universal resource locator (URL) indicating a full, absolute path name to where the data for the stub file is located. The primary file server also stores, in a set of new and changed files 32, each file of the read-write snapshot copy that has been written to since the time of creation of the read-only snapshot copy.

In a preferred implementation, the read-write snapshot copy facility 30 is built upon a distributed hierarchical storage management facility 33. The distributed hierarchical storage management facility 33 is built upon a data migration service 34. The distributed hierarchical storage management facility is constructed by adding certain offline file attributes to the file attributes that are typically associated with the files of a file system. Offline file attributes include an attribute indicating whether or not the data of the file is online (i.e., in the same file server as in a conventional file system) or whether it is offline (i.e., in another file server). For an offline file, the file includes an attribute including a universal resource locator (URL) specifying a full absolute network path name where the data of the file is located, an attribute specifying a read access method, and an attribute specifying a write access method. The access methods include a pass-through method in which the offline file data is accessed without migrating the offline file data to storage of the primary file server, and a full migration method in which the offline file data is migrated to storage of the primary file server, the file is made online, and then the file data is accessed in the primary file server. For a read stub file that is a data file, its read access method is pass through, and its write access method is full migration. For a read stub file that is a directory file, its read access method is full migration, and its write access method is full migration.

Figure 2:
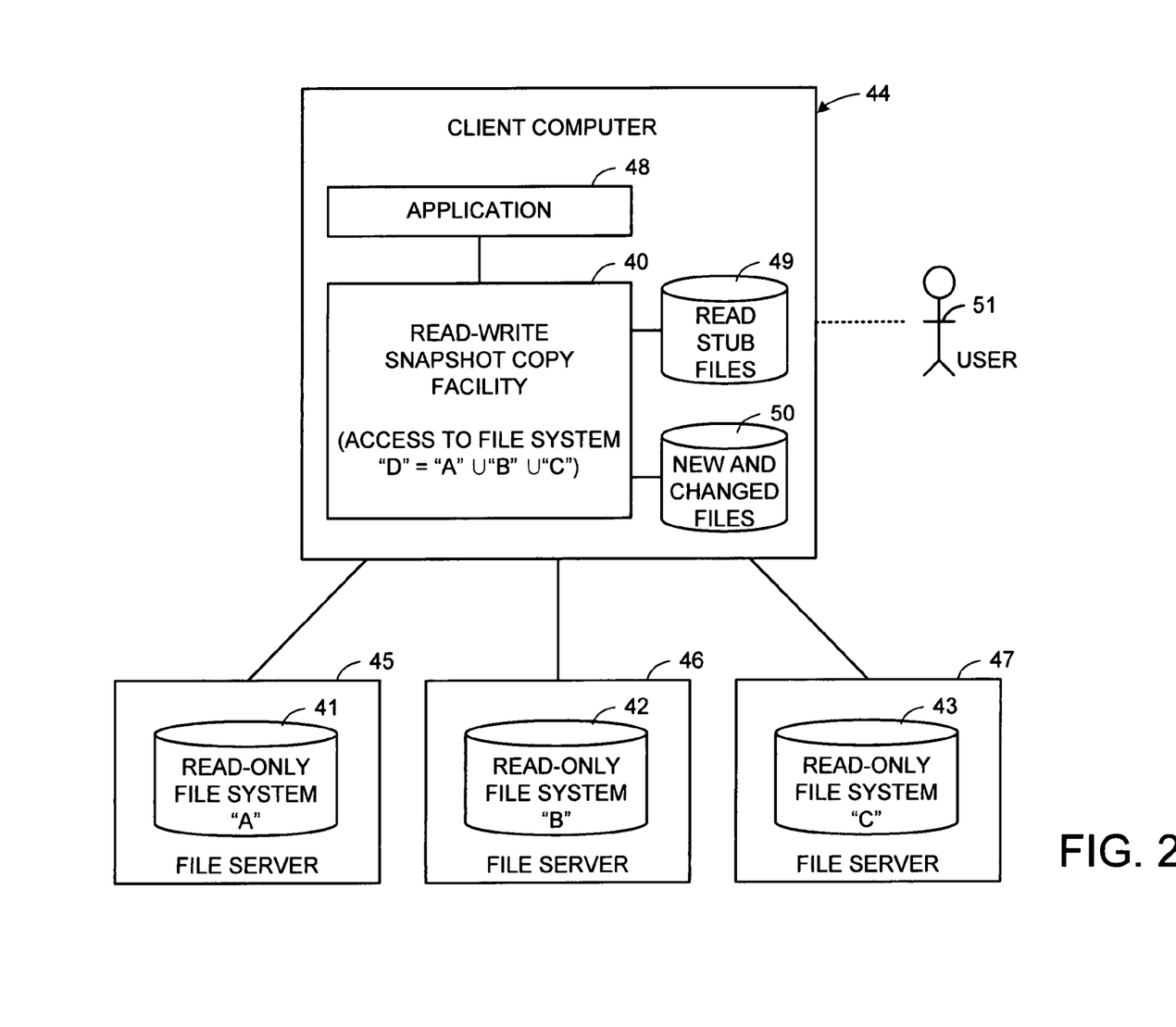
FIG. 2 is a block diagram of another way of using a distributed open writable snapshot copy facility in accordance with the present invention for expanding file system boundaries by creating a read-write snapshot copy file system from a plurality of distributed read-only file systems.

FIG. 2 shows that a distributed open writable snapshot copy facility 40 can be used for expanding file system boundaries by creating a read-write snapshot copy file system from a plurality of distributed read-only file systems 41, 42, and 43. In this example, the read-write snapshot copy facility 40 is a program in a client computer 44, and the read-only file systems 41, 42, and 43 are stored in respective file servers 45, 46, and 47. For example, the client computer 44 executes an application program 48 that provides a program development environment, and the distributed read-only file systems 41, 43, and 43 are program libraries. The read-write snapshot copy facility 40 maintains read stub files 49 that provide URLs to files in the read-only file systems 41, 42, and 43. A user 51 of the client computer 44 is a computer programmer who modifies some of the program files in the program libraries in order to customize the collection of computer programs that comprise the read-write snapshot file system. When a program file is modified, the corresponding read stub file is replaced with the changed program file. Once the collection of computer programs is tested and debugged, the user can convert the read-write snapshot file system to a production file system by converting all of the read stub files 49 to online files by a full migration of the file data for these files from the file servers 45, 46, ad 47 to the client computer 44.

Figure 3:
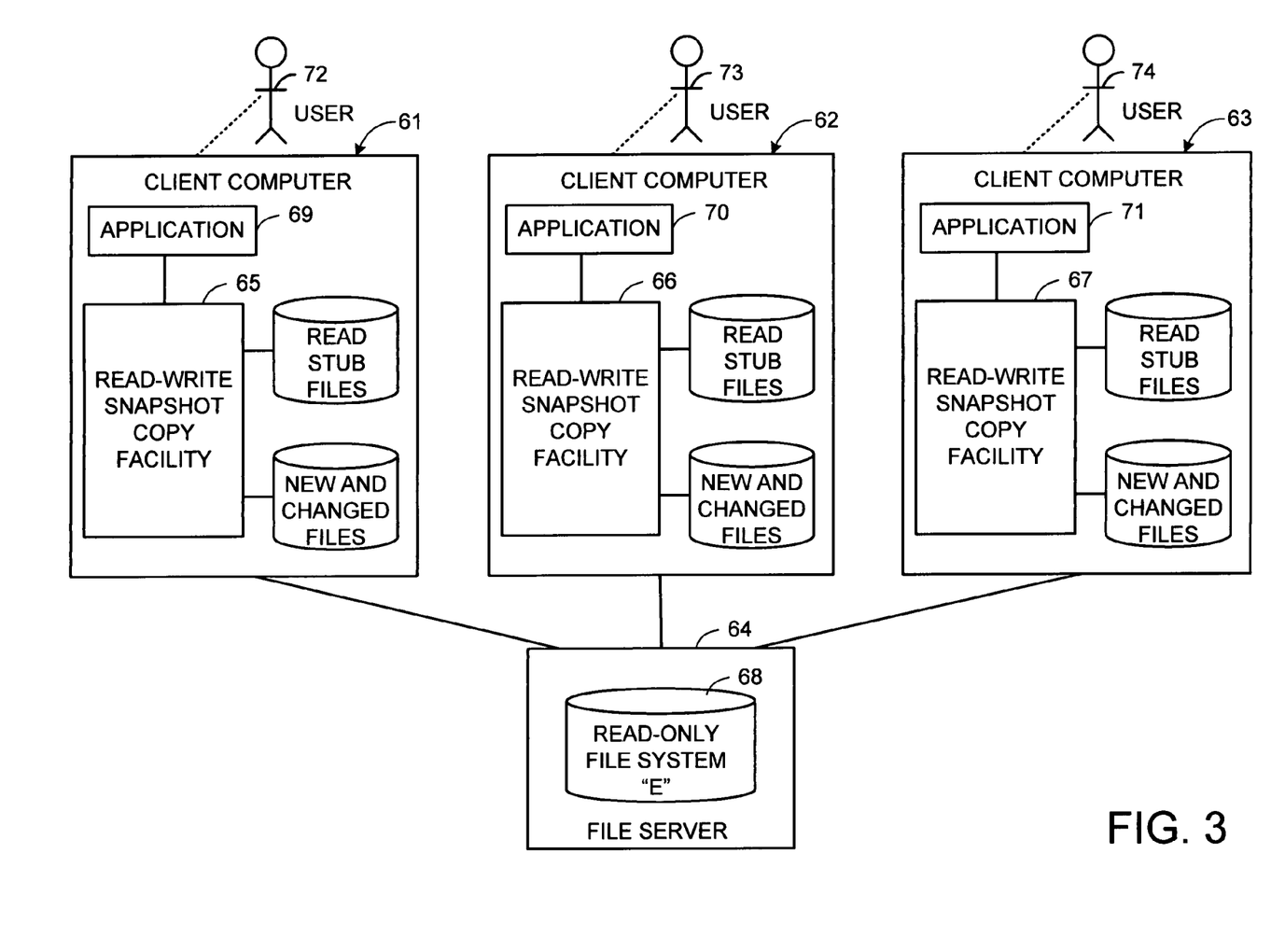
FIG. 3 is a block diagram of yet another way of using a number of the distributed open writable snapshot copy facilities in accordance with the present invention for working upon multiple writable snapshot copies of the same read-only file system.

FIG. 3 shows another example of using a read-write snapshot copy facility. In this example, each of a plurality of clients 61, 62, and 63 has a respective read-write snapshot copy facility 65, 66, 67 providing a respective read-write snapshot of the same read-only snapshot file system 68 from a file server 64. These multiple read-write snapshot copies are used to save space and allow parallel processing on a source data set. Each of the users 72, 73, 74 virtually uses the entire data set of the read only file system while physically only reserving space for modified files and pointers to the read only copy. The read-only snapshot file system 68, for example, is a snapshot copy of a production file system that has been corrupted by a system failure. Each client 61, 62, 63 is a work station of a respective data analyst 72, 73, 74 attempting to use a respective application program 69, 70, 71 to repair the production file system by working upon the respective read-write snapshot copy. If and when one of the data analysts is successful, the production file system is repaired by restoring the production file system with the files of the respective read-write snapshot copy file system. This restoration process involves deleting any files of the production file system 70 that are different from the files of the respective read-write snapshot copy file system, and then copying from the read-write snapshot copy file system to the production file system any files of the read-write snapshot copy file system that are different from the files of the production file system.

Figure 4:
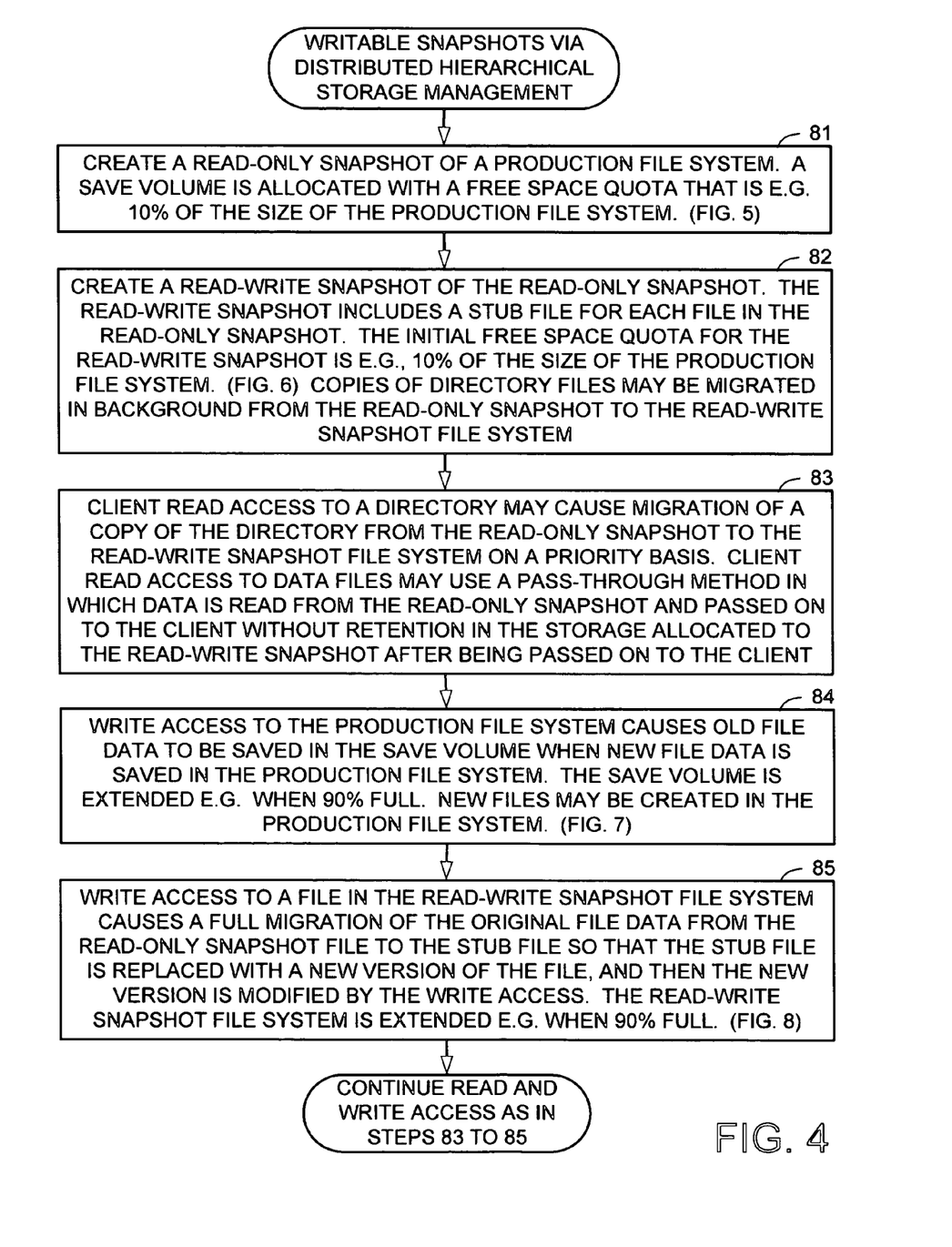
FIG. 4 is a flowchart showing how read-write snapshot copies are created and used in the data processing system of FIG. 1.
Figure 5:
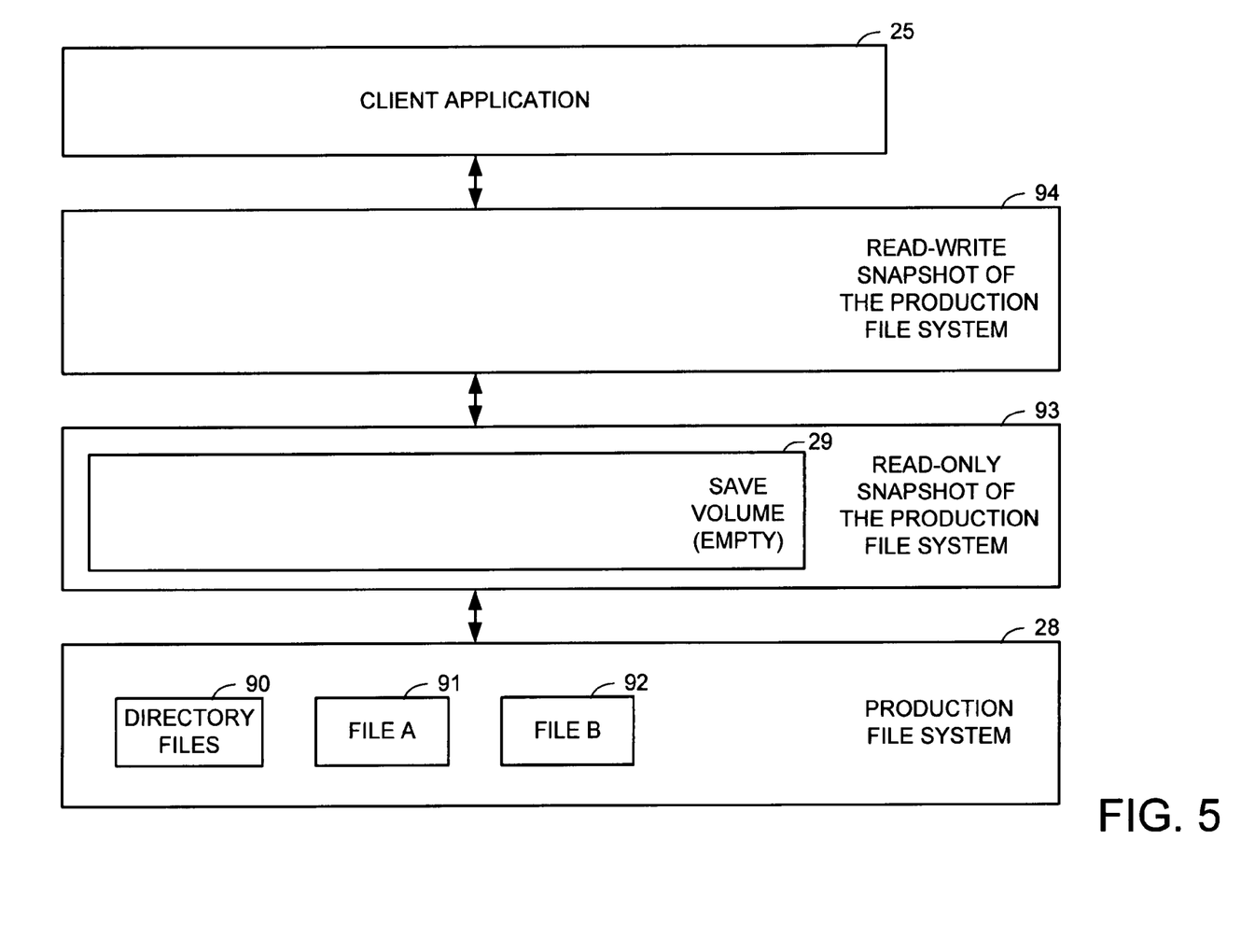
FIG. 5 is a block diagram showing an initial state of the data processing system in FIG. 1 just after the creation of a read-only snapshot of a production file system.

FIG. 4 shows how read-write snapshot copies are created and used in the data processing system of FIG. 1. In a first step 81, the secondary file server 24 creates a read-only snapshot of the production file system. This includes allocation of a save volume that initially has an amount of free space that is a small fraction of the storage space used by the production file system. For example, the save volume is initially allocated an amount of free space that is 10% of the size of the production file system. FIG. 5 shows the state of the data processing system at this point, assuming that the production file system includes directory files 90 and only two data files 91 and 92. Although the save volume 29 is empty at this point, the read-only snapshot 93 includes the files 90, 91 and 92 because the read-only snapshot 93 also includes by reference any files that have not changed in the production file system since the time of creation of the read-only snapshot.

Figure 6:
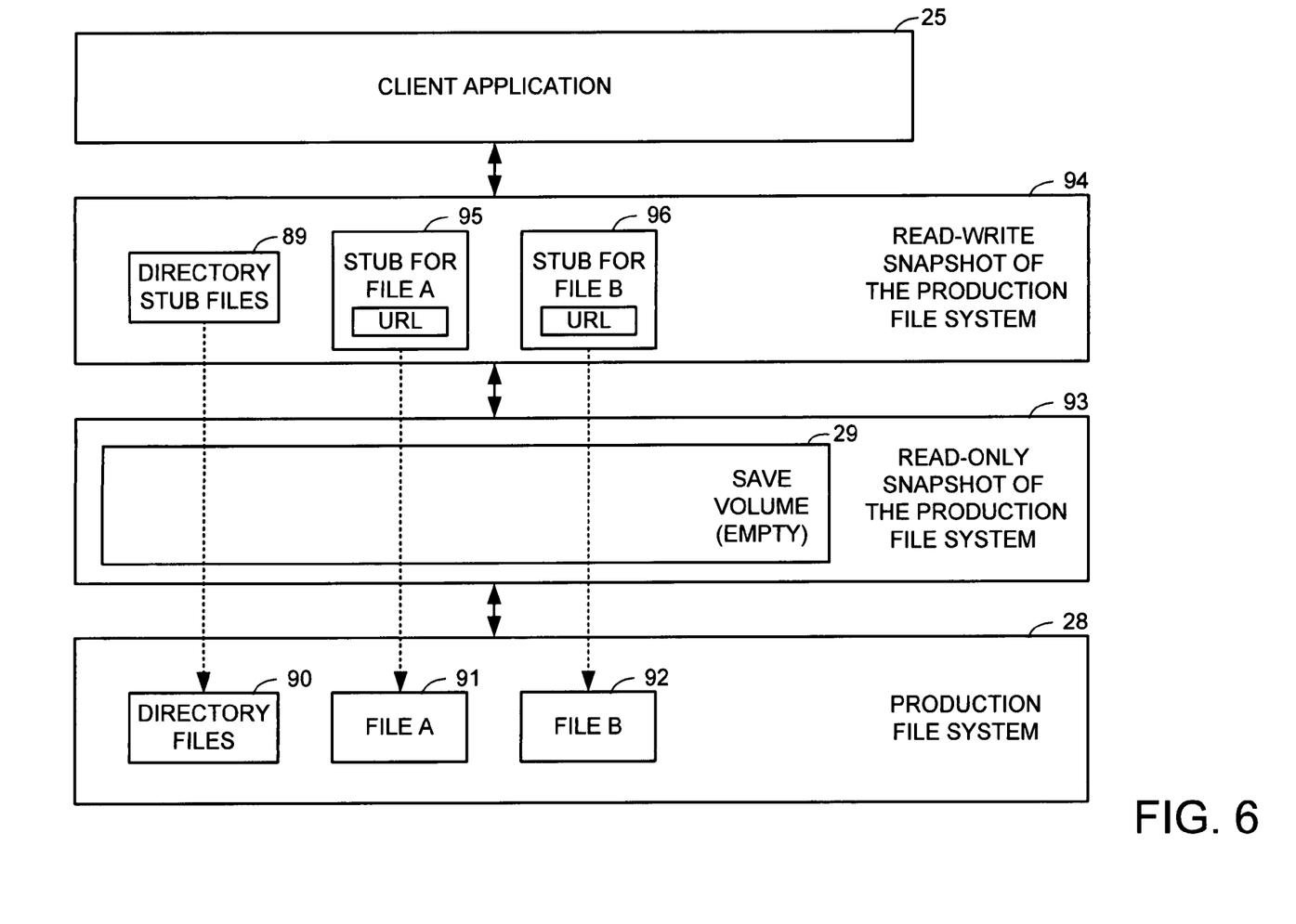
FIG. 6 is a block diagram showing a second state of the data processing system in FIG. 1 just after the creation of a read-write snapshot of the read-only snapshot of the production file system.

In step 82 of FIG. 4, the primary file server creates a read-write snapshot of the read-only snapshot. The read-write snapshot is initially allocated an amount of free space for read stub files and changed files that is a small fraction of the storage space used by the production file system. For example, the read-write snapshot is initially allocated an amount of free space that is 10% of the storage space used by the production file system. A read stub file is created for each file in the read-only file system, and each read stub file includes a URL pointing to the respective file in the read-only snapshot copy file system. The state of the data processing system at this point is shown in FIG. 6. In this example, directory stub files 89 are created for the directory files 90, a stub file 95 is created for the file 91, and a stub file 96 is created for the file 92. Then a full migration of the content of directory files 90 from the read-only snapshot to the directory stub files 89 in the primary file server may begin in a background mode.

For some applications, it may be desirable to create a read-write snapshot file system that is a partial copy of a production file system. In this case, in step 82, stub files could be created for a selected portion of the production file system. For example, a graphical user interface could display to the user the names of the directories and files in the production file system, and the user could select the directories and files to be included in the read-write snapshot file system. This could be done in the same fashion used for selecting directories and files in conventional backup and recovery programs, such as the Microsoft Backup™ program included with Microsoft Windows™ operating systems beginning with the Microsoft Windows 95™ operating system. It is also possible to create a read-write snapshot file system that is a partial copy of a production file system by basing the read-write snapshot copy file system on a read-only file system that is a partial copy of the production file system.

For some applications, it may be desirable to create a read-write snapshot file system that is a partial copy of a production file system such that selected files in the read-write snapshot file system include only a portion of the data in the corresponding files of the production file system. In step 82, for example, this could be done by setting an extent limit attribute in each of the stub files. Such an extent limit attribute could specify a maximum number of blocks of data to be referenced by the stub file, or ever migrated to the stub file from the read-only snapshot file system. This could be useful, for example, if the files are technical publications or data compilations which include an abstract or index in the first few data blocks of each file.

In step 83 of FIG. 4, read access of a client application to a directory file in the read-write snapshot may cause a full migration of data on a priority basis. Read access of a client application to a data file in the read-write snapshot causes the data to be read from the read-only snapshot using the pass-through method. It also would be possible to use a partial read migration of file data from the read-only snapshot to the primary server, in which the data requested would be linked to the stub file and retained in the primary file server after the file data is returned to the client application. The partial read migration method may use an optimized block span, in which are migrated to the primary file server the data of a certain number (such as 128) of file system blocks following the last file system block requested by the client.

Figure 7:
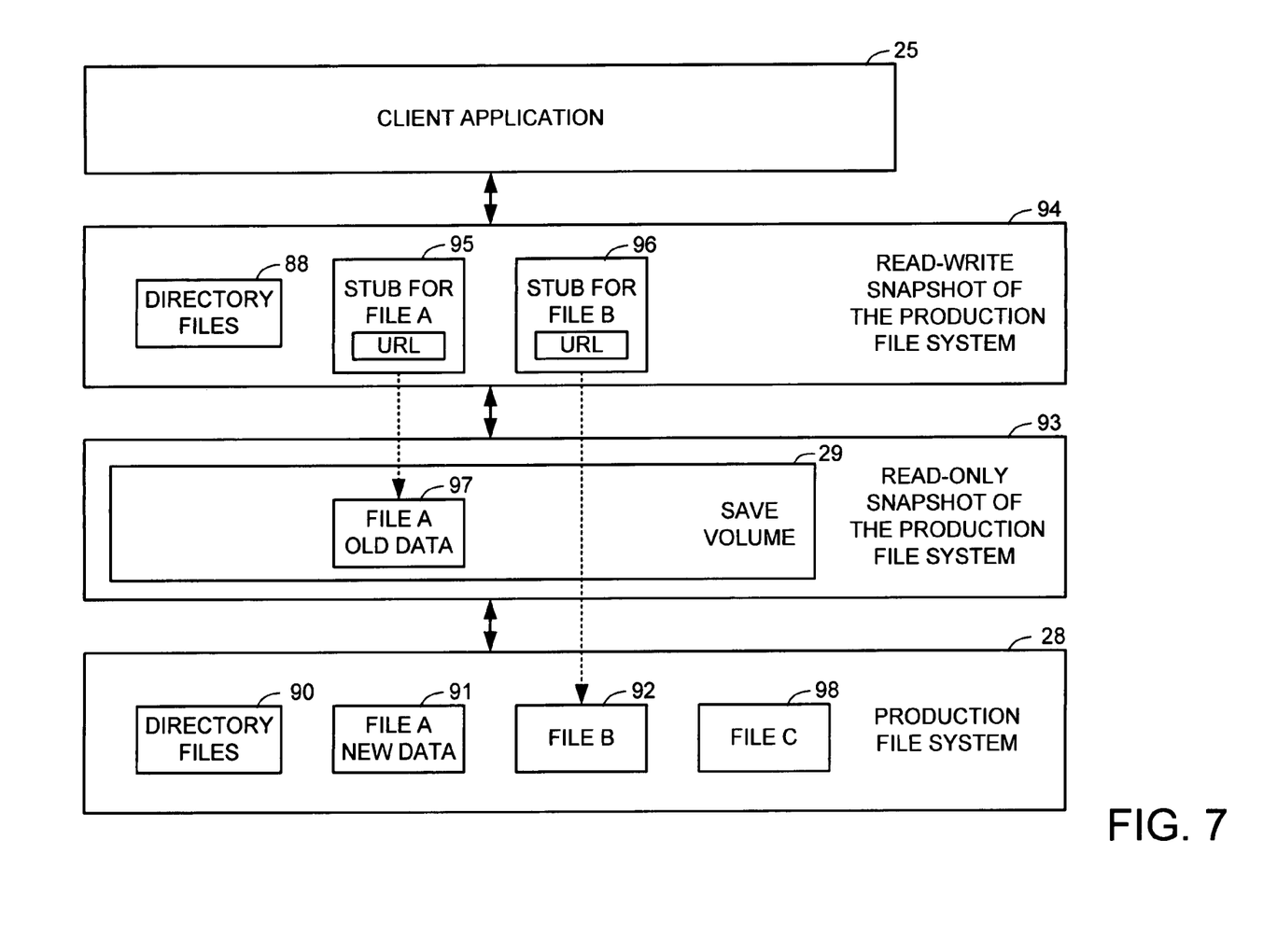
FIG. 7 is a block diagram showing a third state of the data processing system in FIG. 1 after modification of the production file system.

In step 84 of FIG. 4, write access to the production file system causes old file data to be saved in a save volume when new file data is saved in the production file system. If and when the save volume becomes 90% full, its quota of free space is extended. New files may also be created in the production file system. The state of the data processing system at this point is shown in FIG. 7. The migration of the directory files has been completed so that all of the directory stub files have been replaced with directory files 88. New data has been written to the file 91 in the production file system, and the old data 97 of the file 91 has been written to the save volume 29. A new file 98 has been written to the production file system.

Figure 8:
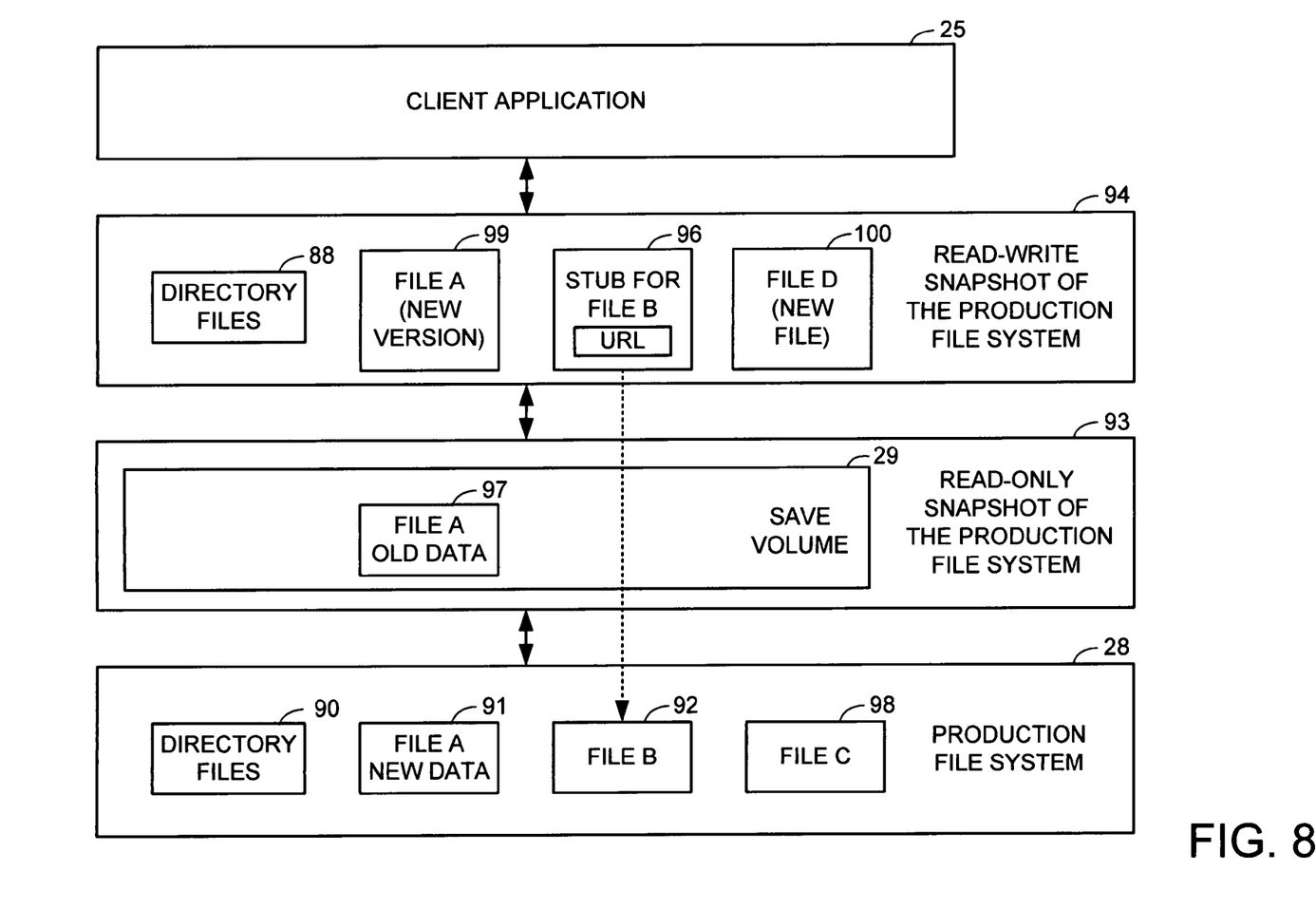
FIG. 8 is a block diagram showing a fourth state of the data processing system in FIG. 1 after modification of the read-write snapshot file system.

In step 85 of FIG. 4, write access to a file in the read-write snapshot file system causes a full migration of the original file data from the read-only snapshot file to the stub file so that the stub file becomes replaced with a new version of the file, and then the write access modifies the new version and becomes one of the changed files (32 in FIG. 1). New files may also be created in the read-write snapshot file system. The storage quota for the read-write snapshot file system is extended if and when the read-write snapshot file system becomes 90% full. The state of the data processing system at this point is shown in FIG. 8. The stub file 95 has been replaced with the changed file 99, and a new file 100 has been written to the read-write snapshot file system.

Figure 9:
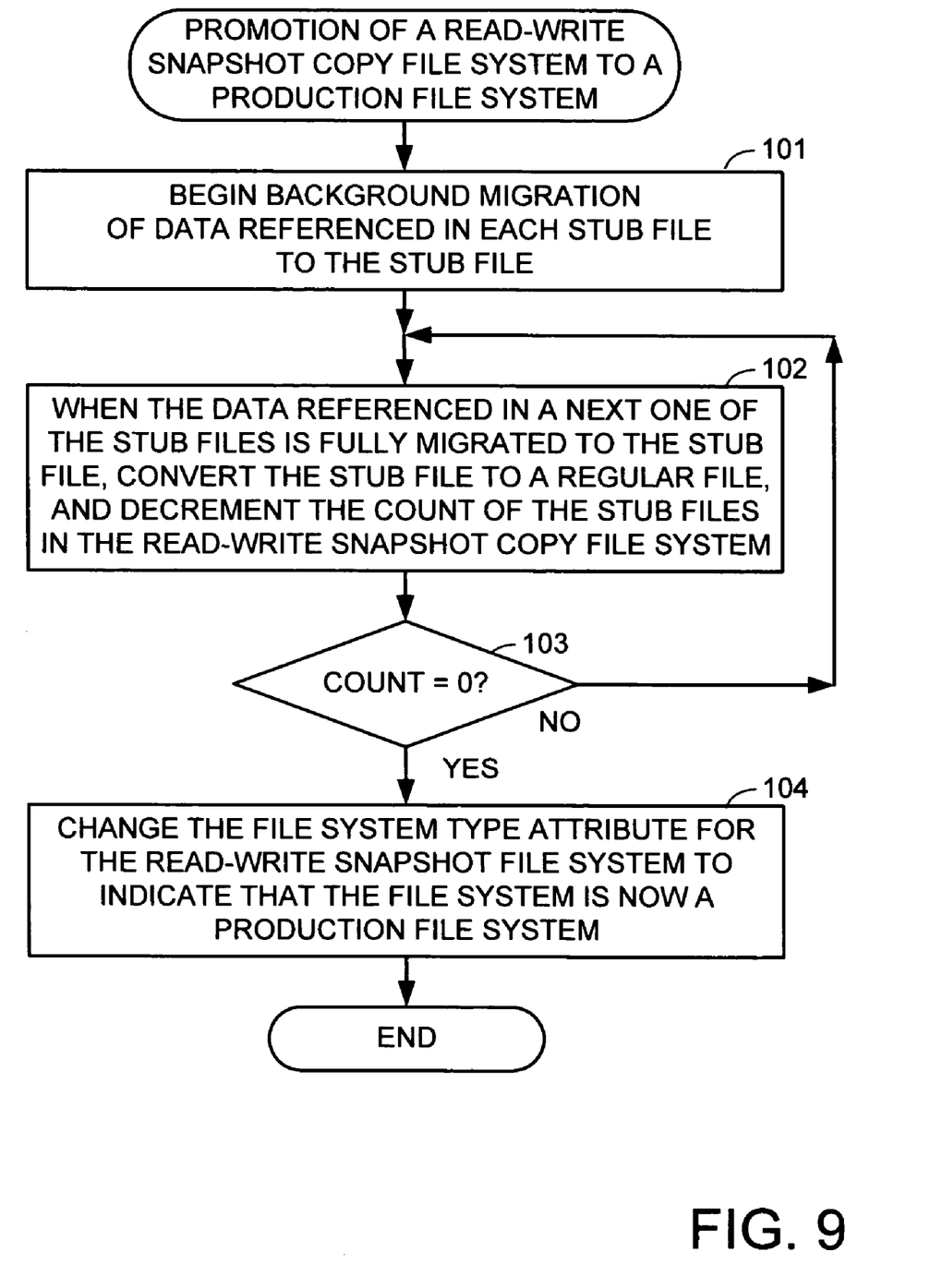
FIG. 9 is a flowchart of a procedure for promotion of a read-write snapshot copy file system to a production file system.

FIG. 9 shows a flowchart of a procedure for promotion of a read-write snapshot copy file system to a production file system. In step 101, the read-write snapshot copy facility begins a background migration of data referenced in each stub file to the stub file. This background process maintains a count of the number of stub files in the read-write snapshot copy file system. In step 102, when the data referenced in a next one of the stub files is fully migrated to the stub file, the read-write snapshot copy facility converts the stub file into a regular file, and decrements the count of the stub files in the read-write snapshot copy file system. In step 103, if the count has not been decremented to zero, then execution loop back to step 102. Otherwise, once the count has been decremented to zero, execution continues from step 103 to step 104. In step 104, a file system type attribute is changed for the read-write snapshot file system to indicate that the file system has been converted into a production file system.

It should be apparent that the read-write snapshot copy facility as described above was especially designed for a distributed and open network environment. However, the read-write snapshot copy facility could be used together with a read-only snapshot copy facility in the same conventional file server containing the production file system and having dedicated data links to a limited number of client computers. It would also be possible to use the read-write snapshot copy facility together with a read-only snapshot copy facility in the same workstation or personal computer containing the production file system. In these cases, a primary advantage to the read-write snapshot copy facility would be the savings in storage by the ability of the stub files in the read-write snapshot copy file system to reference the data in the corresponding files of the production file system.

In view of the above, it has been shown how to construct a read-write snapshot copy facility from a hierarchical storage management facility. The read-write snapshot copy file system initially comprises stub files pointing to the files in a read-only snapshot copy file system. When an application writes to a file in the read-write snapshot copy file system, the read-write snapshot copy facility migrates a copy of the file to replace the stub file, and then writes to the migrated file. Because the read-write snapshot copy facility references the files in the read-only snapshot file system in a network namespace using standard protocols such as NFS or CIFS, the read-write snapshot copy facility permits referencing of distributed read-only snapshot file systems in an open (heterogeneous) network environment, and the read-write snapshot copy is scalable by linking the read-write snapshot copy facility to multiple file servers containing read-only snapshot file systems. An unlimited number of read-write snapshots can be created because a read-write snapshot facility can reside in each client computer and minimal storage need be allocated in each client computer for storing only changed files and read stubs. If the client computers have sufficient additional storage, directories can be fully migrated, and partial read migration also can be used for bringing frequently accessed data closer to the user. The read-write snapshot copy facility also operates in a way that is independent of the operation of a read-only snapshot copy facility that can be used to create the snapshot copy. For example, the read-only snapshot copy facility may operate at either a file level or a volume level, because the read-write snapshot copy facility simply needs read access to the files in the read-only snapshot copy. The read-write snapshot copies can be used for application testing, verification, high performance scaling, size scaling (i.e., creation of much larger virtual files), or performance scaling that is delivered through parallel processing—without the need to multiply the required amount of storage infrastructure.

What is claimed is:

1. A method comprising:
   a read-write snapshot copy facility creating a read-write snapshot copy of at least a portion of a production file system by creating stub files including pointers to data files in a read-only snapshot copy of at least the portion of the production file system; and
   the read-write snapshot copy facility responding to a read request from an application program to read data from a read-write snapshot copy of at least a portion of one of the data files in the read-only snapshot copy of at least the portion of the production file system by accessing one of the stub files to obtain a pointer to said one of the data files, and using the pointer to said one of the data files to read data from said one of the data files and to return the data read from said one of the data files to the application program; and
   the read-write snapshot copy facility responding to a write request from the application program to write data to a read-write snapshot copy of at least a portion of another of the data files in the read-only snapshot copy of at least the portion of the production file system by accessing another of the stub files to obtain a pointer to said another of the data files, and using the pointer to said another of the data files to read data from said another of the data files to produce a file that is written to by the application program and that replaces said another of the stub files.

2. The method as claimed in claim 1, wherein the read-write snapshot copy facility is in a first file server that stores the stub files, and a read-only snapshot copy facility is in a second file server that stores the production file system, and the read-write snapshot copy facility accesses the read-only snapshot copy of at least the portion of the production file system by accessing the read-only snapshot copy facility.

3. The method as claimed in claim 2, wherein the application program is in a client computer that sends the read request and the write request over a data network to the first file server.

4. The method as claimed in claim 1, wherein the read-write snapshot copy facility and the application program are replicated in each of a number of client computers, and the method includes using the client computers to execute the application programs upon different read-write snapshot copies by accessing a shared read-only file system that is stored in a file server.

5. The method as claimed in claim 1, which includes using the read-write snapshot copy facility to create a read-write file system that is comprised of at least respective portions of a plurality of read-only file systems residing in different file servers.

6. The method as claimed in claim 1, wherein the read-write snapshot copy facility accesses a hierarchical storage management facility for performing pass-through read access of said one of the data files in response to the read request, and for performing a full migration of a copy of said another of the data files in response to the write request.

7. The method as claimed in claim 1, which includes the read-write snapshot copy facility setting an initial value of a storage quota for stub files and new and changed files of the read-write snapshot copy of at least the portion of the production file system, the initial value of the storage quota being a fraction of the size of the production file system.

8. The method as claimed in claim 1, which includes read-write snapshot copy facility migrating directory files from the read-only snapshot copy of at least the portion of the production file system to the read-write snapshot copy of at least the portion of the production file system as a background process, and migrating a directory file from the read-only snapshot copy of at least the portion of the production file system to the read-write snapshot copy of at least the portion of the production file system as a priority process in response to a request from the application program for read access to the directory file.

9. The method as claimed in claim 1, which includes operating a read-only snapshot copy facility to create the read-only snapshot copy of at least the portion of the production file system and to provide the read-write snapshot copy facility with read access to the read-only snapshot copy of at least the portion of the production file system.

10. The method as claimed in claim 1, which includes promoting the read-write snapshot copy of at least the portion of the production file system by migrating read-only snapshot data referenced by the stub files in order to produce read-write data files that are used for replacing the stub files.

11. Apparatus comprising a data processing device including storage and a read-write snapshot copy facility, the read-write snapshot copy facility being programmed for creating, in the storage of the data processing device, stub files including pointers to data files in a read-only snapshot copy of at least a portion of a production file system;
   the read-write snapshot copy facility being programmed for responding to a read request from an application program to read data from a read-write snapshot copy of at least a portion of one of the data files in the read-only snapshot copy of at least the portion of the production file system by accessing one of the stub files to obtain a pointer to said one of the data files, and using the pointer to said one of the data files to read data from said one of the data files and to return the data read from said one of the data files to the application program; and the read-write snapshot copy facility being programmed for responding to a write request from the application program to write data to a read-write snapshot copy of at least a portion of another of the data files in the read-only snapshot copy of at least the portion of the production file system by accessing another of the stub files to obtain a pointer to said another of the data files, and using the pointer to said another of the data files to read data from said another of the data files to produce a file that is written to by the application program and that replaces said another of the stub files.

12. The apparatus as claimed in claim 11, wherein the data processing device is a first file server, and wherein the apparatus further comprise a second file server, and a data network linking the first file server to the second file server for transmission of data between the first file server and the second file server, and the read-only snapshot copy facility is in the second file server, and the second file server has storage for storing the production file system.

13. The apparatus as claimed in claim 12, which includes a client computer linked by the data network to the first file server for the transmission of data between the client computer and the first file server, wherein the application program is stored in the client computer for execution by the client computer.

14. The apparatus as claimed in claim 11, which includes a plurality of client computers, and wherein the read-write snapshot copy facility and the application program are replicated in each of the client computers so that the application programs are executable for accessing different read-write copies by the read-write snapshot copy facilities accessing a shared read-only file system.

15. The apparatus as claimed in claim 11, wherein the read-write snapshot copy facility is programmed to create a read-write file system that is comprised of a plurality of read-only copies of file systems residing in different file servers.

16. The apparatus as claimed in claim 11, wherein the read-write snapshot copy facility includes a hierarchical storage management facility for performing pass-through read access of said one of the data files in response to the read request, and for performing a full migration of a copy of said another of the data files in response to the write request.

17. The apparatus as claimed in claim 11, wherein the read-write snapshot copy facility is programmed for setting an initial value of a storage quota for stub files and new and changed files of a read-write snapshot copy of at least the portion of the production file system, the initial value of the storage quota being a fraction of the size of the production file system.

18. The apparatus as claimed in claim 11, wherein the read-write snapshot copy facility is programmed for migrating directory files from the read-only snapshot copy of at least the portion of the production file system to a read-write snapshot copy of at least the portion of the production file system as a background process, and migrating a directory file from the read-only snapshot copy of at least the portion of the production file system to the read-write snapshot copy of at least the portion of the production file system as a priority process in response to a request from the application program for read access to the directory file.

19. The apparatus as claimed in claim 11, which further includes a read-only snapshot copy facility for creating the read-only snapshot copy of at least the portion of the production file system, and a network linking the read-only snapshot copy facility to the read-write snapshot copy facility for providing the read-write snapshot copy facility with read access to the read-only snapshot copy of at least the portion of the production file system.

20. The apparatus as claimed in claim 11, wherein the data processing device is programmed for creating an independent production file system by migrating read-only snapshot data referenced by the stub files in order to produce read-write data files used for replacing the stub files.

* * * * *